United States Patent
Geleji et al.

(10) Patent No.: US 10,956,133 B2
(45) Date of Patent: Mar. 23, 2021

(54) STATIC OPTIMIZATION OF PRODUCTION CODE FOR DYNAMIC PROFILING

(71) Applicant: International Business Machines Corporation, Armonk, NY (US)

(72) Inventors: Geza Geleji, Eastleigh (GB); Martin A. Ross, Gosport (GB); Craig Stirling, Southampton (GB); Christopher J. Poole, Romsey (GB); Fiona M. Crowther, Lancashire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 16/203,330

(22) Filed: Nov. 28, 2018

(65) Prior Publication Data

US 2020/0167137 A1 May 28, 2020

(51) Int. Cl.
    *G06F 9/45*      (2006.01)
    *G06F 8/41*      (2018.01)
    *G06F 11/36*     (2006.01)

(52) U.S. Cl.
    CPC .............. *G06F 8/433* (2013.01); *G06F 8/443* (2013.01); *G06F 11/3604* (2013.01)

(58) Field of Classification Search
    CPC ...... G06F 8/433; G06F 8/443; G06F 11/3604; G06F 11/36; G06F 11/3612; G06F 11/3682; G06F 11/3616; G06F 11/3636
    USPC ........................................................ 717/151
    See application file for complete search history.

(56) References Cited

U.S. PATENT DOCUMENTS

| | | | | |
|---|---|---|---|---|
| 7,047,394 | B1 * | 5/2006 | Van Dyke | G06F 9/30167 703/26 |
| 7,228,404 | B1 * | 6/2007 | Patel | G06F 9/30174 712/228 |
| 7,630,986 | B1 * | 12/2009 | Herz | G06Q 10/10 |
| 7,996,814 | B1 * | 8/2011 | Qureshi | G06F 11/079 717/120 |
| 9,348,566 | B1 | 5/2016 | Moseley et al. | |
| 9,444,916 | B2 * | 9/2016 | Backholm | H04L 61/1511 |
| 9,535,673 | B1 | 1/2017 | Cui et al. | |
| 9,547,483 | B1 | 1/2017 | Boxall et al. | |

(Continued)

OTHER PUBLICATIONS

Title: Profile-guided automated software diversity author: A Homescu, published on 2013.*

(Continued)

*Primary Examiner* — Chameli Das
(74) *Attorney, Agent, or Firm* — Christopher Pignato, Esq.; Hye Jin Lucy Song, Esq.; Heslin Rothenberg Farley & Mesiti P.C.

(57) ABSTRACT

Methods, computer program products, and systems are presented. The methods include, for instance: obtaining a native code having a large number of counters embedded for profiling. Use cases that is serviced by the native code is identified and respective use case profiles representing performance characteristics of a corresponding use case are created. Best predictors identifying one of the use case profiles are determined and variants for a production code is created with only the best predictors instead of the large number of counters. The variants are produced with the use case profiles to to a production environment for performing the use cases.

20 Claims, 9 Drawing Sheets

(56) References Cited

U.S. PATENT DOCUMENTS

| | | | | |
|---|---|---|---|---|
| 2002/0112227 | A1* | 8/2002 | Kramskoy | G06F 8/4442 717/148 |
| 2005/0050530 | A1* | 3/2005 | Civlin | G06F 9/45525 717/153 |
| 2007/0079298 | A1* | 4/2007 | Tian | G06F 8/45 717/140 |
| 2007/0204108 | A1* | 8/2007 | Griswell, Jr. | G06F 12/0862 711/137 |
| 2008/0155550 | A1* | 6/2008 | Tsafrir | G06F 9/4881 718/103 |
| 2012/0084759 | A1* | 4/2012 | Candea | G06F 11/3612 717/126 |
| 2012/0144167 | A1* | 6/2012 | Yates, Jr. | G06F 9/30174 712/216 |
| 2015/0347103 | A1 | 12/2015 | Mahaffey et al. | |
| 2017/0262309 | A1 | 9/2017 | Crowther et al. | |

OTHER PUBLICATIONS

Title: A dynamic optimization framework for a Java just-in-time compiler author: T Suganuma, source: ACM SIGPLAN pubslished on, 2001.*

Title: On the feasibility of online malware detection with performance counters ; author: J Demme, published 2013, source: ACM.*

Title: Efficient path profiling author: T Ball, Published on 1996 ;source: IEEE.*

Mell et al., "The NIST Definition of Cloud Computing", National Institute of Standards and Technology, U.S. Dept. of Commerce, NIST Special Publ. 800-145, Sep. 2011, 7 pages.

Chelverina, "Alternatives of Profile-Guided Code Optimizations for One-Stage Compilation", Jan. 2016, https://link.springer.com/article/10.1134/S0361768816010035, 2 pages.

"Profile-Guided Optimization", http://scc.ustc.edu.cn/zlsc/tc4600/intel/2017.0.098/compiler_f/common/core/GUID-9C4692D9-BBDE-4F36-95B1-58295EAFA5B5.html, dated: 2017.

"Understanding Just-In-Time Compilation and Optimization", Oracle, 2011, 5 pages.

Global Dossier Report for U.S. Appl. No. 16/203,330, filed Nov. 28, 2018, dated Dec. 8, 2020.

Scott Oaks, "4. Working with the JIT Compiler", Web page <https://www.oreilly.com/library/view/java-performance-the/9781449363512/ch04.html>, 39 pages, retrieved on Jul. 6, 2018, excerpt from "Java Performance: The Definitive Guide" by Scott Oaks, O'Reilly, 2014.

* cited by examiner

500

```
L531: void MyClass::function_a(int, int, long) {
L532: /* Counter A to profile function_a */
      ...
      /* operations of function_a() */
      ...
L540: }

L541: unsigned MyOtherClass::method_b(char *, int) {
L542: /* Counter B to profile method_b */
      ...
      /* operations of method_b() */
      ...
L550: }
```

FIG. 5

STATIC OPTIMIZATION OF PRODUCTION CODE FOR DYNAMIC PROFILING

TECHNICAL FIELD

The present disclosure relates to cognitive analytics and learning technology, and more particularly to methods, computer program products, and systems for optimizing profiling locations in relation with profile-guided optimization of various use cases.

BACKGROUND

Conventionally, runtime performance characteristics of a computer program is profiled by use of various runtime profiling techniques such as call stack sampling. Certain compilers generate a profile for the computer program by running the computer program embedded with counters at various profiling locations of the computer program. According to the performance/usage characteristics of the computer program in a particular environment for a specific use case as represented in the profile, a machine code corresponding to the computer program is optimized. The more frequently used a certain functional component of the computer program is, the more likely the same functional component is to be optimized in order to improve throughput and/or resource utilization of the computer program.

A "use case," as that term is used herein, is any software design to perform a list of actions or event steps that: (i) are performed by software and hardware of a computer system; and (ii) is intended to achieve a goal or desired end result. A use case may involve some degree of human participation. Use cases are typically used to find and solve problems in the hardware and/or software of computer systems. The instantiation of a "use case instantiation" on a computer system may herein sometimes be referred to a "running a use case." In this art, a use case instantiation is sometimes more simply referred to as a use case, but as a strict matter of technical language, a use case is a copy of the use case software that is stored to set up use case instantiations as the running of instantiations becomes needed or desired. A "variant" for a use case is a code version that is customized for the use case, to meet the system requirements identified by the use case, and accordingly, performing the variant for the use case is more efficient than performing a generic code version not customized for the use case.

It is known to sell various types of computer system implemented to various customers. When these kinds of services are sold to third party customers, this is herein referred to as a "production environment" context (as opposed to in-house computer work done for managing data of the service provider company or doing basic research or the like. Various types of computer implemented services include, but are by no means limited to: (i) web site hosting; (ii) massive data store/database; (iii) cloud based services and microservices; and (iv) voice over IP communication.

SUMMARY

The shortcomings of the prior art are overcome, and additional advantages are provided, through the provision, in one aspect, of a method. The method includes, for instance: obtaining, by one or more processor, a native code having N number of counters embedded; selecting, by the one or more processor, K number of use cases to be serviced by the obtained native code; creating, by the one or more processor, K number of use cases profiles corresponding to each use case amongst the selected K number of use cases, where each use case profile includes performance characteristics corresponding to respective use cases; determining, by the one or more processor, B number of best predictors from the N number of counters embedded in the native code, the best predictors identifying one of the use case profiles; generating, by the one or more processor, variants respective to use cases based on the determined best predictors; and producing, by the one or more processor, the generated variants and corresponding use case profiles to a production environment for performing the use cases.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts an exemplary section of a source code corresponding to the native code with the counters, in accordance with one or more embodiments set forth herein;

DETAILED DESCRIPTION

Figure 1:
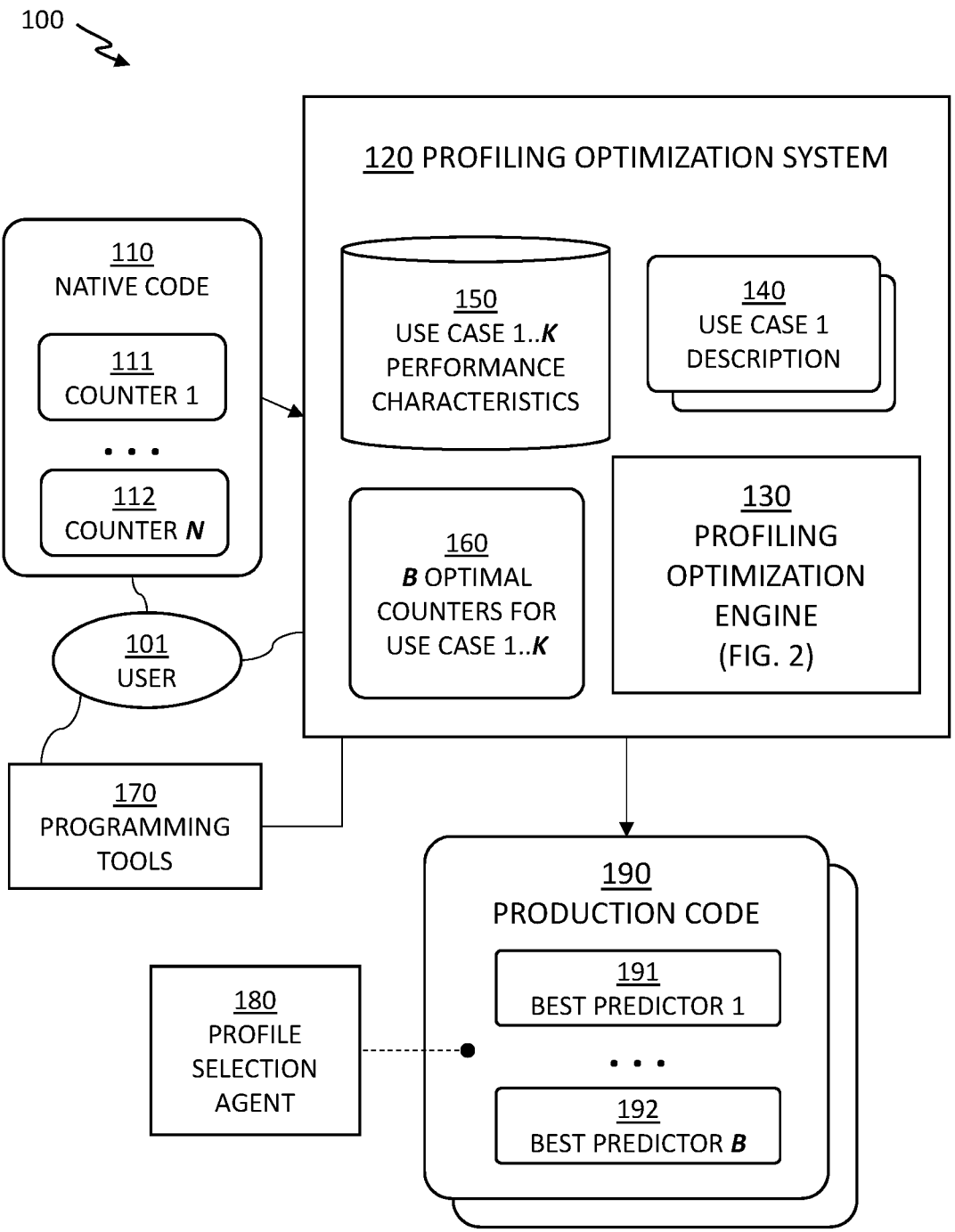
FIG. 1 depicts a system for optimizing program profiling locations in production codes for a plurality of use cases, in accordance with one or more embodiments set forth herein.

FIG. 1 depicts a system 100 for optimizing program profiling locations in production codes for a plurality of use cases, in accordance with one or more embodiments set forth herein.

Embodiments of the present invention recognize that, in production environments where software suites operate for service, performance optimization is common. One of such optimization mechanism called profile-guided optimization (PGO) utilizes execution profiles, or simply profiles, recording performance characteristics respective to certain use cases. However, in production environments where service workload is of most significance, dynamic profiling of use cases in order to optimize the performance of a variant particular to a certain use case creates runtime overhead and accordingly, may adversely affect service performance of the variant running a use case.

Embodiments of the present invention also recognize that it is difficult for users in production environments to identify which variant of the software suite would perform the best, because a currently running use case does not have a matching variant in the software suite, and also because performance characteristics of each execution may differ even for the same use case over time. Accordingly, in order to determine a most suitable variant for a presently running use case, some form of dynamic profiling is unavoidable.

The system 100 is to minimize runtime overhead of dynamic profiling while most efficiently performing profile-guided optimization in a production environment. The system 100 includes a profiling optimization system 120. The profiling optimization system 120 includes a profiling optimization engine 130, descriptions for the K number of use cases 140, performance characteristics data respective to K number of use cases 150, and B number of optimal counters for profiling the K number use cases 160. One or more programming tools 170 are coupled to the profiling optimization system 120.

The profiling optimization system 120 takes an input of a native code 110 from a user 101. N number of counters 111, 112, at N number of profiling locations, respectively, are embedded in the native code 110, by use of programming tools 170 such as a code profiler, a compiler supporting profiling functionalities, or by the user 101 manually in a source code of the native code 110. In time driven profiling, a timer is used along with a counters in executables to periodically trigger evaluation of counters at the profiling locations, and in event-driven profiling, occurrences of certain events triggers evaluation of one or more counter. The user 101 in this specification represents an individual program developer or a team of program developers, programming the native code 110 and/or inserting the counters 111, 112. The profiling optimization system 120, by use of the programming tools 170, generates an executable form of the native code 110.

One or more use case description 140 is a list of actions or events, represented in various forms, including text, an outline, or a template, to specify interactions between various components to achieve a certain goal. The components of the use case description 140 include, but are not limited to, endpoints, a role that is referred to as an actor in Unified Modeling Language. The use case description 140 may be devised by various vendors and/or experts in a common industry practice in order to achieve functional system requirements.

The profiling optimization engine 130 generates respective performance characteristics data for each use cases 150 by running the native code 110 according to the use cases description 140, by use of various profiling techniques such as call stack sampling. The profiling optimization engine 130 subsequently stores the performance characteristics data for each use cases 150 as respective use profiles for the use case 1 . . . K. In this specification, the performance characteristics data for a use case j is used to identify which use case is presently running and accordingly, which variant would be best for the presently running use case in a production environment. The performance characteristics data for a use case j is also referred to, a use case profile j, a use profile j, a static use profile j, an execution profile j, a static use case execution profile j, or a static execution profile j. The use case profile is referred to as static, in contrast with conventional dynamic profiles created by dynamic profiling of variants in the production environment, as common with profile-guided optimization.

A "use case profile," as that term is used herein, is any set of machine readable data that includes a set of parameter value(s) for parameter(s) that measure various performance aspects when the respectively corresponding use case has performed on computer system(s). A use case profile may contain one, or more, of the following types of parameters: (i) performance speed; (ii) storage required, (iii) memory required.

The profiling optimization engine 130 identifies the B number of optimal counters 160 from the N number of counters in the native code 110 based on the static use profiles respective to each use case.

The B number of optimal counters 160 are selected from the N number of counters originally in the native code 110. The B number of optimal counters 160 are a minimal number of counters selected from the counters 111, 112 that are sufficient for identifying which of the K number use cases is currently executing. The number of optimal counter 160, that is B, is significantly less than the original number of counters in the native code 110, that is N.

The profiling optimization system 120 produces one or more production code 190 along with the performance characteristics data respective to K number of use cases 150. The production code 190 is optimized for dynamic profiling with B number of best predictors 191, 192, where B and N are respective positive integers, and B is less than N (B<N). The one or more production code 190 and the performance characteristics data respective to K number of use cases 150 are distributed with a profile selection agent embedded in the production code 180, which dynamically profiles the one or more production code 190 while performing for a plurality of use cases in production environments. The performance characteristics data respective to K number of use cases 150 is unique to each use case, and the profiling optimization engine 130 generates respective use profiles based on the performance characteristics data respective to K number of use cases 150. The profile selection agent 180 identifies which use case variant of the production code 190 is presently running, by counting the results from the best predictors 191, 192, and searching for the closest use profile from the performance characteristics data respective to K number of use cases 150.

Embodiments of the present invention recognizes that program profiling, also referred to as software profiling, dynamic profiling, or profiling, is performed on a computer program while the computer program runs, to measure various performance and/or resource usage metrics on how the computer program runs, for the purpose of profile-guided optimization (PGO) for functional components of the computer program according to various use cases. Examples of the performance and/or resource usage metrics include, but are not limited to, memory requirements and usage, computational demands, time complexity, respective usage of particular instructions/functional blocks, frequencies and durations of respective calls for functions and methods. In order to profile the performance and/or resource usage metrics of the computer program, a profile selection agent or other profiling system runs the computer program as having profiling instruments embedded, often along with other computer programs, and analyzes the record created by the respective profiling instruments. An examples of the profiling instruments include, but are not limited to, counters embedded in various profiling locations such as each entry/exit of component calling units of the computer program, and functional elements within the component calling units such as conditional branches and loops.

The profile selection agent 180 utilizes profiles generated based on the dynamic profiling to optimize variants of the one or more production code 190 specific for a use case, such that the variant would perform more efficiently for the use case in a production environment. In this specification, the term variant indicates a distinctive machine code corresponding to a certain use case. The term production environment is used mostly by developers to describe the setting where software applications are actually put into operation for intended services for end users.

Profiling computer programs in operation, also referred to as dynamic profiling in this specification, inherently creates significant overhead on the performance of the computer programs as additional operations are to be performed on every profiling location of the computer programs. Accordingly, for the one or more product code 190 distributed to respective production environments for services, it would be desirable that the one or more product code 190 has a less profiling overhead for a significantly similar profiling accuracy. The profiling optimization system 120 generates the one or more production code 190 having significantly less number of best predictors 191, 192, (B) than original number of counters 111, 112, (N) in the native code 110, and accordingly, pre-optimizes profiling of the production code 190 prior to the production code 190 is being put into service in the production environment.

The profile selection agent 180, as distributed with the one or more production code 190, would perform profile-guided optimization and similar approaches in a production environment that services users, by profiling the production code 190.

In a production environment, an application integration engine provides support for connectivity of the production code 190 to a plurality of heterogeneous endpoints respective to applications in the production environment. By use of the profile selection agent 180, the application integration engine identifies a specific use profile of the production code 180, and consequently, put a variant corresponding to the specific use profile of the production code 180 into use in the production environment. Even though the application integration engine is capable of communication through all the endpoints implementing respective protocols, the production environment often services a limited number of endpoints at a certain time, and accordingly, the production code in the production environment would have improved performance by using a subset of the pre-optimizes use profiles based on the use case performance characteristics 150.

For example, the use case descriptions 140 involve hundreds of distinctive endpoints implementing various communication techniques/protocols, including, but not limited to, Java Message Service (JMS), message queues (MQ) and mailboxes for inter-process communication (IPC), or for inter-thread communication within the same process, Transmission Control Protocol (TCP) of TCP/IP suite, Hypertext Transfer Protocol (HTTP) family protocols, Simple Object Access Protocol (SOAP), Customer Information Control System (CICS) for rapid, high-volume online transaction processing, service component architecture (SCA), Message Queuing Telemetry Transport (MQTT), or the like. Amongst a selected group of endpoints, various message formats are utilizes for communication, with various message transformation, message routing, and numerous other features to facilitate communications between the endpoints. Examples of the message formats commonly used in production environments include, but are not limited to, Comma-separated values (CSV), Extensible Markup Language (XML), Health Level-7 (HL7) for transfer of clinical and administrative data, focus on the application layer (L7) in the Open Systems Interconnection (OSI) model, Transaction Log (TLOG) by a few vendors for retail point of sales (POS) transaction log, Extensible Stylesheet Language Transformations (XSLT), Embedded Structured Query Language (ESQL), or the like.

In the production environment, an exemplary use case is described as: 1) to read a message through HTTP; 2) to perform a simple transformation of the message; 3) to output a row of the transformed message to a database as a transaction log; 4) to route the message to one of several possible other endpoints and to send a request according to the messages via MQ; and 5) to obtain a response to the sent request through HTTP and to relay the response to a client application originating the message. The aforementioned use case is typical to web-based online transactions, and likely to occur in the order of billions or more in regular production environments that service end users. Because performance characteristics such as computation requirements, memory demands, time complexity, of the exemplary use case is unlikely to change between the endpoints, the performance characteristics can be profiled and the variant executing the exemplary use can be optimized for the profiled performance characteristics in order to improve throughput of the exemplary use case in the production environment.

Considering that the number of aforementioned operations required for the intercommunication between the endpoints in a production environment is often in the order of billions, profiling details of execution in how the endpoints communicate in respective use cases and optimizing an instance of the production code 190 customized for each use case greatly improves overall performance of the production environment. Because, as noted, the number of aforementioned operations required for the intercommunication between the endpoints in the production environment is in the order of billions, however, profiling performances of the production code 190 causes a significant runtime overhead for the use cases 140 in the production environment. Accordingly, the most efficient profiling with the least number of counters at respective profiling locations for the use cases 140 that are frequently used in the production environment is desirable. The least number of counters that had been determined by the profiling optimization engine 130 are represented as the B number of best predictors 191, 192, in the production code 190. Accordingly, the profile selection agent 180 can achieve improved performance with the production code 190 in the production environment by minimizing the overhead for profiling the executions of the production code 190, and by facilitating profile-guided optimization (PGO) of variants of the production code 190 for respective use cases.

Embodiments of the present invention recognizes that a few examples of PGO techniques include, but are not limited to, inlining one function to another to simplify frequent callings to a relatively short function, virtual call speculation and converting to a conditional direct call, register allocation for frequently accessed data item, basic block optimization to reduce page switches and consequent memory overhead, size/speed optimization that is proportional to the time used in certain functional blocks, function layout to place functions along a same execution path together in a same section based on profiled caller/callee behavior and call graphs, conditional branch optimization to place more frequently tested condition up front to minimized the number of total conditions to be tested, code separations, memory intrinsics, and combinations thereof. Embodiments of the present invention also recognizes that the PGO is focused on more frequently used functions and/or applications, and accordingly, rarely used applications are less likely to be profiled and optimized based on profiled performance characteristics. Embodiments of the present invention utilizes aforementioned profiling techniques available in the industry in order to generate the use case performance characteristics data 150 for the use cases 140.

Embodiments of the present invention recognizes that during execution in the production environment, runtime overhead for dynamic profiling as in the case of Java Just-in-Time (JIT) compiler would be avoided by the profiling optimization system 120 by having the production code 190 profiled pre-production to include only the reduced number (B) counters selected profiling locations for the best profiling efficiencies rather than having counters at every profiling locations (N).

In certain embodiments of the present invention, the production code 190, the use case performance characteristics data 150, and the profile selection agent 180 are distributed together, enabling the profile selection agent 180 to select a use case variant from the production code 190 according to the pre-profiled performance characteristics data 150 for a corresponding use case in the production environment without call stack sampling and/or any dynamic profiling of all counters in the native code 110 as in conventional dynamic profiling. By including only the pre-selected optimal counters 160 for profiling all interested use cases 140 as the best predictors 191, 192 in the production code 190, the profile selection agent 180 can profile the production code 190 in the production environment and switch between variants specifically optimized for each use case by simply counting the best predictors without involving conventional dynamic profiling operations. Consequently, the production code 190 runs and is eligible for the profile-guided optimization with minimal runtime overhead that is significantly less than dynamically profiling the native code 190 with the all counters 111, 112.

Figure 2:
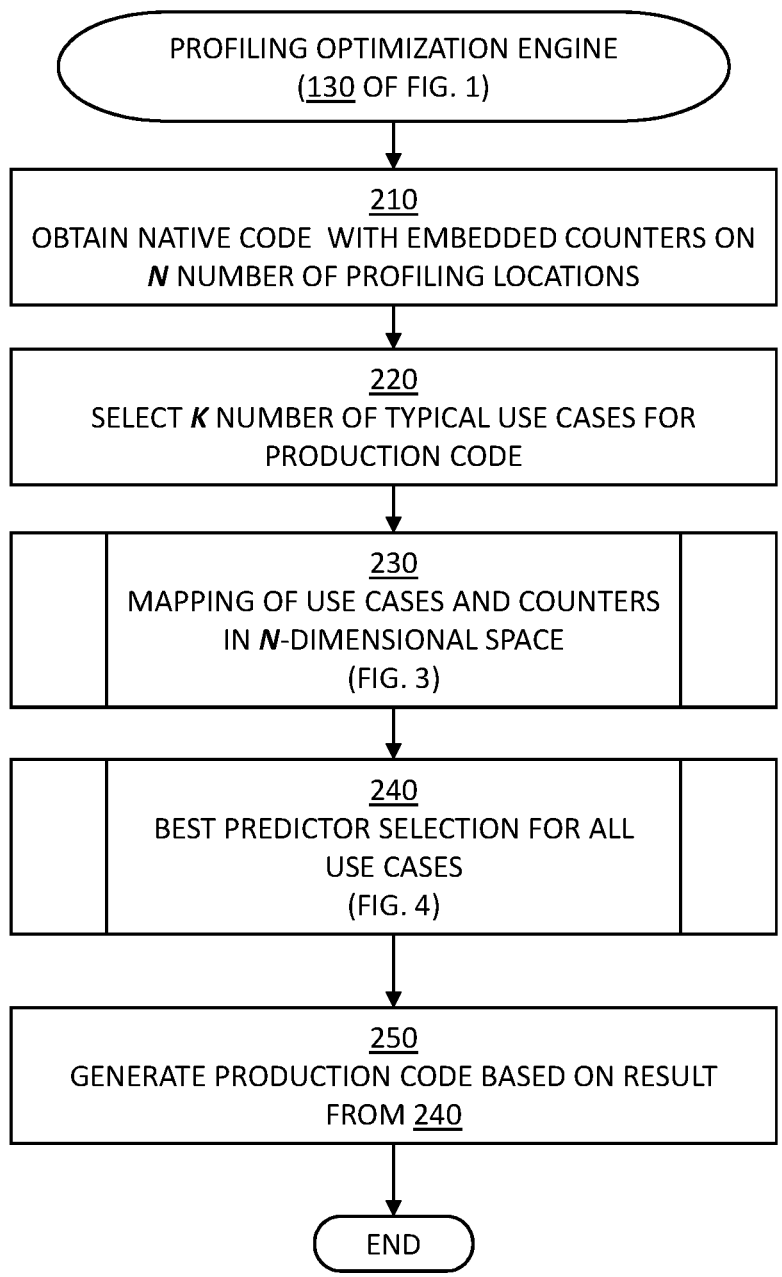
FIG. 2 depicts a flowchart of operations performed by the profiling optimization engine, in accordance with one or more embodiments set forth herein.

FIG. 2 depicts a flowchart of operations performed by the profiling optimization engine 130 of FIG. 1, in accordance with one or more embodiments set forth herein.

In block 210, the profiling optimization engine 130 takes input of the native code 110 and embeds counters at N number of profiling locations in the native code 110 by use of a code profile or a compiler with profiling feature in the programming tools 170. In certain embodiments of the present invention, the profiling optimization engine 130 takes a source code form of the native code with counters 111, 112, and/or respective customized profiling code, embedded manually by the user 101 at N number of profiling positions in the source code form, and then compiles to obtain an executable form of the native code 110 with counters 111, 112. In this specification, the term code, without being indicated as a source code, indicates a machine code that is executable on a computer, as used for the native code 110 and the production code 190. An exemplary source code section marking a couple of profiling locations of the native code 110 is shown in FIG. 5 and corresponding description. Then, the profiling optimization engine 130 proceeds with block 220.

In block 220, the profiling optimization engine 130 selects K number of typical use cases for the production code 190. In certain embodiments of the present invention, the profiling optimization engine 130 prompts the user 101 to identify the use cases. In certain embodiments of the present invention, the user 101 preconfigures the profiling optimization engine 130 with an ordered list of use case descriptions 140. Then, the profiling optimization engine 130 proceeds with block 230.

In block 230, the profiling optimization engine 130 maps performance characteristics data corresponding to the use cases selected in block 220 and original counters from the native code 110 onto an N-dimensional space, where N is the number of counters originally embedded in the native code 110. The performance characteristics data corresponding to the use cases are respectively referred to as a use case profile 1 . . . K. The profiling optimization engine 130 analyzes dependencies of the counters on respective use cases in mapping the counters in the N-D space. Detailed operations of block 230 are presented in FIG. 3 and corresponding description. Then, the profiling optimization engine 130 proceeds with block 240.

In block 240, the profiling optimization engine 130 selects, amongst the counters, B number of optimal counters for use case 1 . . . K 160 that are the most effective for profiling the use cases. Detailed operations of block 240 are presented in FIG. 4 and corresponding description. Then, the profiling optimization engine 130 proceeds with block 250.

In block 250, the profiling optimization engine 130 generates the production code 190 based on results from block 240, resulting in variants for each use case. The profiling optimization engine 130 generates the K number of variants for the K number of use cases, by updating the native code 110 to include only the best predictors 160 instead of all original counters 111, 112, by compiling the updated native code 110 and then by replicating an executable code for K times. The profiling optimization engine 130 embeds the B optimal counters for use case 1 . . . K 160 from block 240 as the best predictors 191,192 in the production code 190. The profiling optimization engine 130 produces and distributes one or more production code 190 and use profiles based on the performance characteristics data respective to K number of use cases 150, such that the profile selection agent 180 or any other comparable controlling mechanism in production environments identifies which use case is presently running without dynamic profiling but by simply counting the results from the best predictors 191, 192, of a variant of the production code 190, and searching for a use profile having the closest best predictor counts, as represented in the N-D space.

The production code 190 is optimized for dynamic profiling with B number of best predictors 191, 192, where B and N are respective positive integers, and B is less than N (B<N). The one or more production code 190 and the performance characteristics data respective to K number of use cases 150 are distributed with an profile selection agent 180 or other similar tool, which dynamically profiles the one or more production code 190 while performing for a plurality of use cases in production environments. The performance characteristics data respective to K number of use cases 150 is unique to each use case, and also referred to as use profiles. The profile selection agent 180 identifies which use case variant of the production code 190 is presently running. Then, the profiling optimization engine 130 terminates processing.

Embodiments of the present invention recognizes that the production code 190 and the use profiles, as distributed with the profile selection agent 180, is used for runtime optimization of each variant for respective use cases, based on profiling the production code 190 with the best predictors 191, 192. The use profiles corresponding to respective use cases are represented as respective point in N-dimensional space, and records from runtime profiling of respective use case variants are projected onto the same N-D space. As the number of profiling locations in the production code 190, that is B, is significantly less than the original number of original counters in the native code 110, that is N, the runtime profiling would cause less overhead in performing profile-guided optimization (PGO) for variants pursuant to respective use cases in the production environment in servicing end users. Furthermore, the remaining profiling locations corresponding to the best predictors, would not require any conventional dynamic profiling operations such as call stack sampling, but only be counted to identify which use case is running. In the production environment, if the profile selection agent 180 discovers that the runtime profiling of a variant running a first use case results in a point in the N-D space that is close to a second point representing a second use case profile than a first point representing the first use case profile, demonstrating that the variant operates more like the second use case, then the profile selection agent 180, or other controlling mechanism in the production environment, switches the variant with another variant optimized for the second use case.

Figure 3:
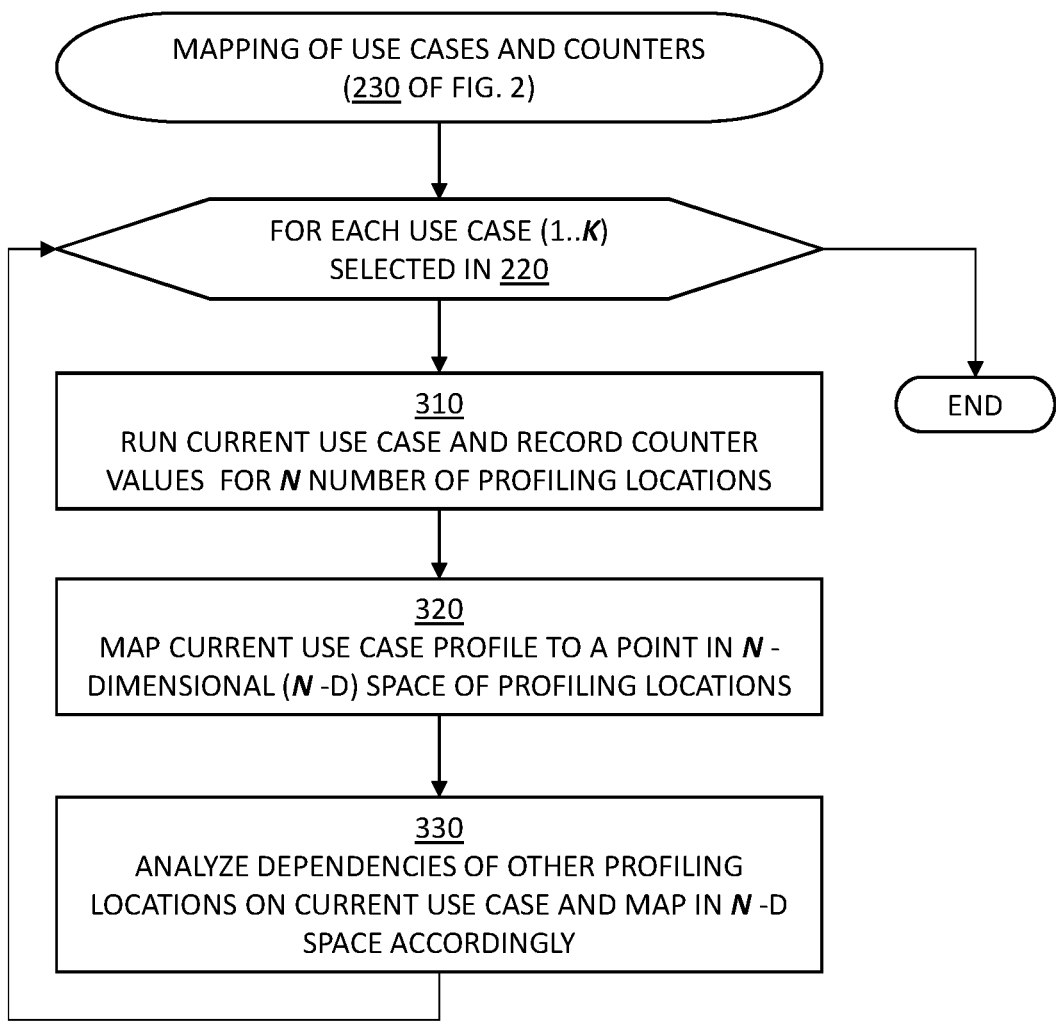
FIG. 3 depicts a flowchart of profiling location mapping onto N-dimensional space, as performed in block 230 of the profiling optimization engine, in accordance with one or more embodiments set forth herein.

FIG. 3 depicts a flowchart of profiling location mapping onto N-dimensional space, as performed in block 230 of the profiling optimization engine 130, in accordance with one or more embodiments set forth herein.

Blocks 310, 320, and 330 are performed as a unit for each use case selected from block 220 of FIG. 2. When the profiling optimization engine 130 processes all use cases, then the profiling optimization engine 130 proceeds with block 240 of FIG. 2, which begins in block 410 of FIG. 4.

In block 310, the profiling optimization engine 130 runs a current use case for a preconfigured number of test runs and records profiling results in a form of counter values for respective profiling locations during the test runs. The number or the period of test runs are defined to have the counter values statistically meaningful for the current use case and/or otherwise distinctively identifying the current use case rather than other use cases. Cumulated counter values of the current use case resulting from the test runs represent performance characteristics data of the current use case and are stored as a use profile for the current use case. Because block 310 profiles execution of the current use case prior to the current use case is being put into service in production environments, block 310 may be referred to as a static profiling, as opposed to the dynamic profiling of the use cases in the production environments. Then, the profiling optimization engine 130 proceeds with block 320.

In block 320, the profiling optimization engine 130 maps the use profile of the current use case resulting from block 310 to a point in the N-dimensional (N-D) space that represents the N number of profiling locations. Then, the profiling optimization engine 130 proceeds with block 330.

In certain embodiments of the present invention, the profiling optimization engine 130 takes the profiling results for each counters corresponding to respective profiling locations in the native code 110, and simply maps the respective counter values as each n-th coordinate for an N-D space point for the current use case. It is noteworthy that the original number of counters (N) in the native code 110 is in the order of thousands to millions.

In block 330, the profiling optimization engine 130 analyzes dependencies of the counters corresponding to all profiling locations on the current use case, and maps the analyzed counters in the N-d space according to the respective dependencies. A dependency of a counter to the current use case indicates how likely the counter is accounted to identify the current use case. Then, the profiling optimization engine 130 loops back to block 310 for a next use case. When all use cases had been processed, then the profiling optimization engine 130 proceeds with block 240 of FIG. 2.

In certain embodiments of the present invention, the profiling optimization engine 130 computes respective coefficients of variation of counter values, that is the standard deviation divided by the mean, on values obtained for the counters corresponding to the respective profiling points. The profiling optimization engine 130 subsequently sorts the computed coefficients in a descending order of magnitude. The profiling optimization engine 130 evaluates counters having the greater numbers as good predictors of the current use case, and identifies counters having the lower numbers as poor predictors of the current use case. When mapped to the N-d space, the good predictors would be distinctively close to a specific use case profile point, while poor predictors would have two or more use case profile points in significantly similar distances.

Figure 4:
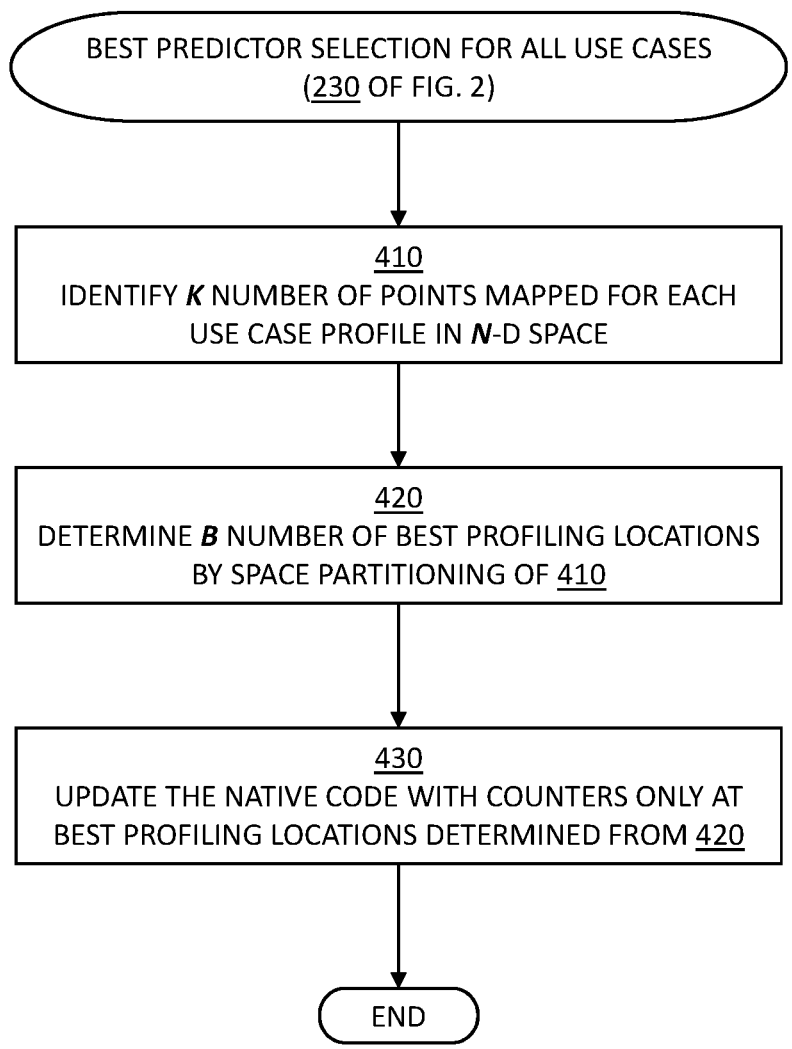
FIG. 4 depicts a flowchart of selecting best predictors, as performed in block 240 of the profiling optimization engine, in accordance with one or more embodiments set forth herein.

FIG. 4 depicts a flowchart of selecting best predictors, as performed in block 240 of the profiling optimization engine 130, in accordance with one or more embodiments set forth herein.

In block 410, the profiling optimization engine 130 identifies the K number of points mapped for each use case in the N-dimensional space. In certain embodiments of the present invention, the profiling optimization engine 130 scans the N-D space for the respective N-D points mapped for the respective use cases in block 320 of FIG. 3. Then, the profiling optimization engine 130 proceeds with block 420.

In block 420, the profiling optimization engine 130 determines the B number of best predictors corresponding to respective best profiling locations by space partitioning of the N-D space with the K number of points corresponding to each use case, as identified from block 410. As noted above in block 330 of FIG. 3, the profiling optimization engine 130 previously analyzed the dependencies of profiling locations on respective use cases, and ordered the profiling locations, the best profiling location having high dependency with the respective use case on the top. Then, the profiling optimization engine 130 proceeds with block 430.

In certain embodiment of the present invention, the profiling optimization engine 130 generates N-dimensional Voronoi tessellation, or Voronoi diagram, with the K number of N-D points corresponding to use cases, as seeds. Based on respective Euclidean distances to each seed from all points in the N-D space, the profiling optimization engine 130 partitions the N-D space into K number of Voronoi cells. An example of space partitioning by use of Voronoi diagram with two (2) seeds corresponding to two (2) use cases, also corresponding use profiles, is presented in FIG. 6 and corresponding description. The profiling optimization engine 130 also generates a space partitioning tree in the N-D space to identify a nearest neighboring point of any given N-D point, which is utilized for discovering the closest use case point for the B number of best predictors. The Voronoi tessellation and the space partitioning tree generation are known in the field of mathematics and computer technology.

In block 430, the profiling optimization engine 130 updates the native code obtained from block 210 with only the B number of best predictors, by removing the (N-B) number of counters at the respective profiling locations that had not been included in the B number of best predictors from block 420. In certain embodiments of the present invention, the profiling optimization engine 130 removes the rest of counters that are not determined as the best predictors from the source code form of the native code 110, and then recompile the native code body with only the best predictors, in order to generate an executable production code 190 with the best predictors 191, 192. Then, the profiling optimization engine 130 proceeds with block 250 of FIG. 2.

FIG. 5 depicts an exemplary section 500 of a source code corresponding to the native code 110 with the counters 111, 112, in accordance with one or more embodiments set forth herein.

The exemplary section 500 includes a function and a method, respectively having a counter. A compiler, or other programming tool with profiling support, assigns respective counters to respective entry points of the function/method. Profiling locations can be determined by configuring the compiler/code profiler options and accordingly, be consistently placed throughout the entire production code without manually programming.

Lines L531, L532, and L540 represents a function_a in the native code 110. The comment on Counter A of L532 in the function_a indicates a profiling location for the function_a. Operations of the function_a appear in other parts of the function_a, within a boundary of the function_a at L540.

Similarly Lines L541, L542, and L550 represents a method_b in the native code 110. The comment on Counter B of L542 in the method_b indicates a profiling location for the method_b. Operations of the method_b appear in other parts of the method_b, within a boundary of the method_b at L550.

The exemplary section 500 is the production code 190 having two (2) counters, and is produced with two (2) use profiles. Two use profiles are generated pre-production, by the profiling optimization engine 130.

Figure 6:
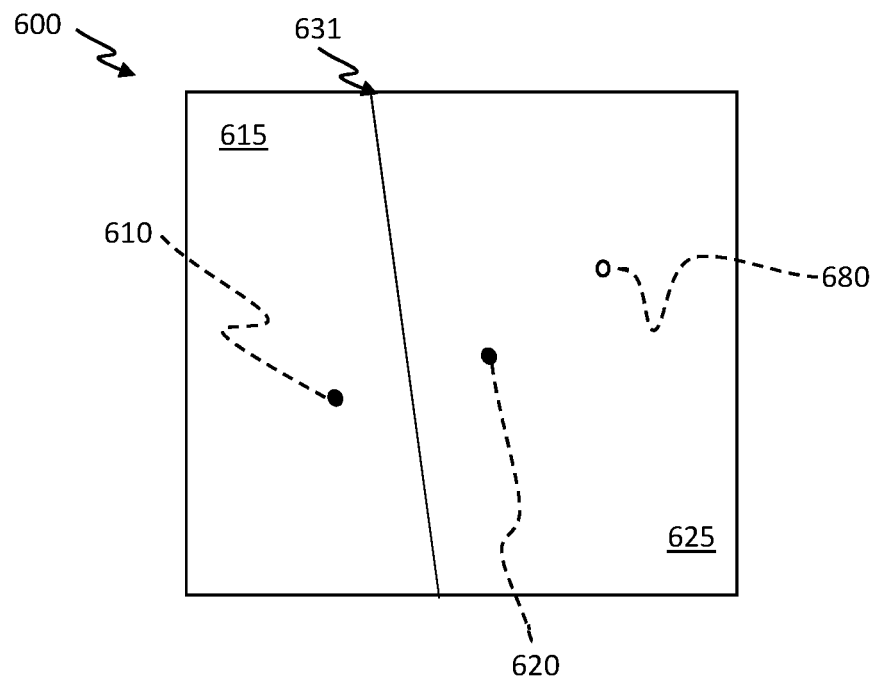
FIG. 6 depicts an exemplary mapping of use cases and counters onto the N-D space, in accordance with one or more embodiments set forth herein.

FIG. 6 depicts an exemplary mapping of use cases and counters onto the N-D space, in accordance with one or more embodiments set forth herein.

An exemplary 2-dimensional space depicts a Voronoi diagram 600 with two (2) Voronoi cells 615, 625, formed based on respective seeds 610, 620. The Voronoi diagram 600 is divided by a straight line 631, which borders the two Voronoi cells 615, 625, based on respective Euclidean distances from the two seeds 610, 620. A first seed 610 represents a 2-D point mapped for a first use profile, and a second seed 620 represents another 2-D point mapped for a second use profile. The exemplary 2-dimensional space 600 is derived from the exemplary section 500 of FIG. 5, having two (2) counters, that is, N=2.

In production environments, when a timer is triggered for dynamic profiling of the code 500, the values of the two counters, Counter A in L532 and Counter B in L542, are evaluated against the Voronoi diagram 600. If a point 680 defined by the values of Counter A and Counter B is closer to either one of the seeds 610, 620, then the profile selection agent 180 would identify the use profile corresponding to the closer seed as a use case that the exemplary code section 500 is currently running. If the exemplary code section 500 running with another use profile, then the profile selection agent 180 would switch to a variant corresponding to the identified use case corresponding to the closer use profile.

For the point 680 in FIG. 6, if the exemplary code section 500 was running a first variant corresponding to the first use profile represented by the first seed 610, because the point 680 is closer to the second seed 620, the profile selection agent 180 would switch to a second variant optimized for the second use profile corresponding to the second seed 620.

The proximity between two points in the N-D space indicates a similarity between respective performance characteristics, and accordingly, executing an executable code optimized for another executable code similar in performance characteristics would perform better than executing a third executable code that has more distinctive than similar performance characteristics.

In the embodiments of the present invention, the production code 190 has a significant less number of counters than the native code 110. Also in the production environment, the production code 190 a timer to evaluate the counters for dynamically profiling the production code 190 needs not be triggered as often as in conventional dynamic profiling of the native code 110 with original counters, because the counters, or the best predictors, in the production code 190 are read only to identify which use case is presently running.

Certain embodiments of the present invention may offer various technical computing advantages, including minimizing runtime profiling overhead required for use case oriented optimization of a production code. Prior to distributing the production code, a native code is run for respective use cases to determine performance characteristics data corresponding to the respective use cases and a static use profile is generated. The number of profiling locations in the production code is significantly reduced by selecting only counters necessary for identifying a use case. The production code and the static use profile in a production environment facilitate, with minimal profiling overhead, dynamic profiling sufficient to identify a use profile of a currently executing variant and to trigger switching of the variant to another variant whose execution is more similarly characterized with the use profile, if necessary. Certain embodiments of the present invention may be distributed in combination with a control structure for mapping the static use profile and a dynamic profiling result, and thresholds for switching variants according to the similarity/distinctiveness between the static use profile and the dynamic profiling result, that is the counter values as represented into a N-dimensional space, where N is the number of counters in a native code prior to static use profiling and optimization. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The static optimization service may be provided for subscribed business entities and/or individuals in need from any location in the world.

Figure 7:
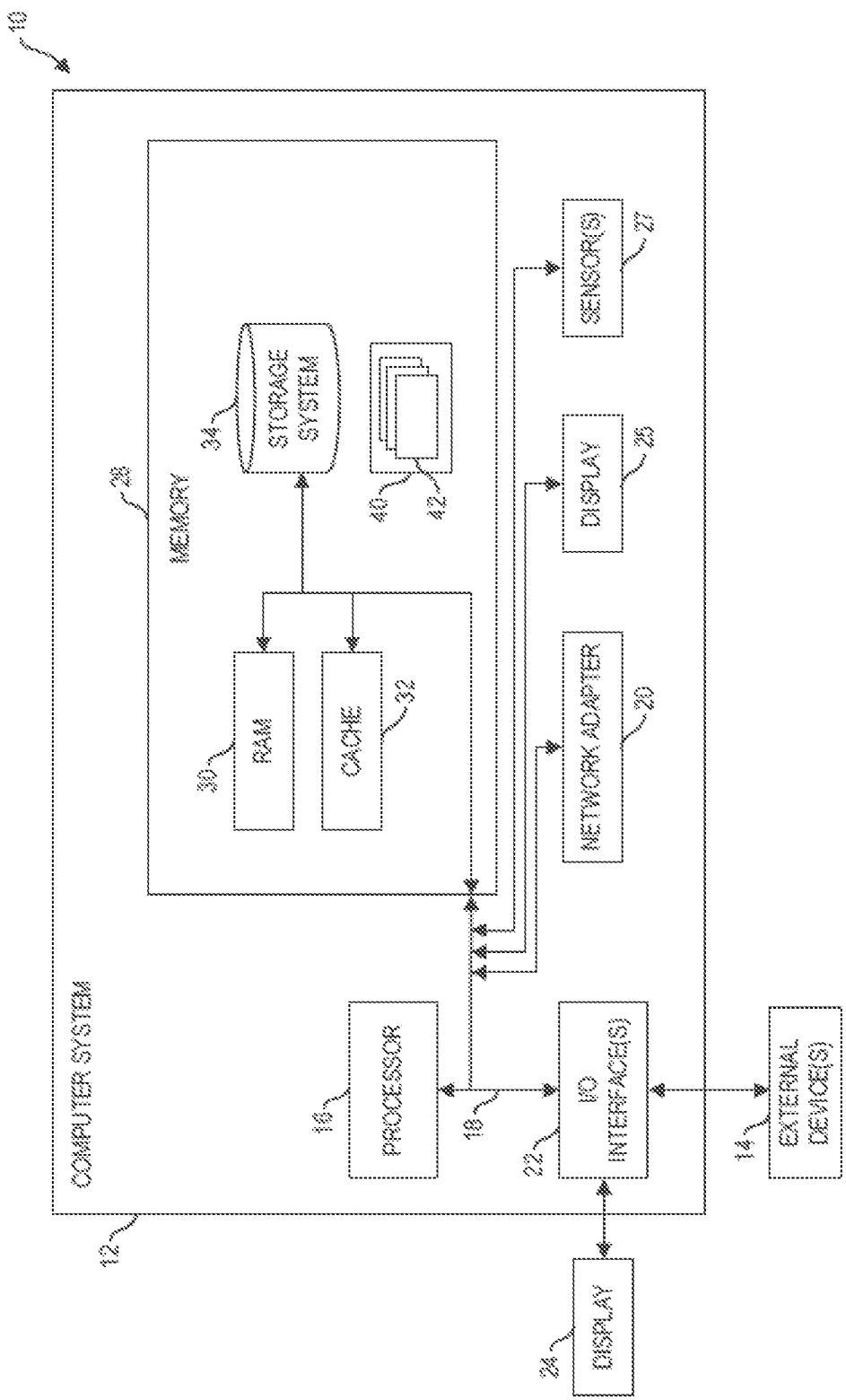
FIG. 7 depicts a cloud computing node according to an embodiment of the present invention.
Figure 8:
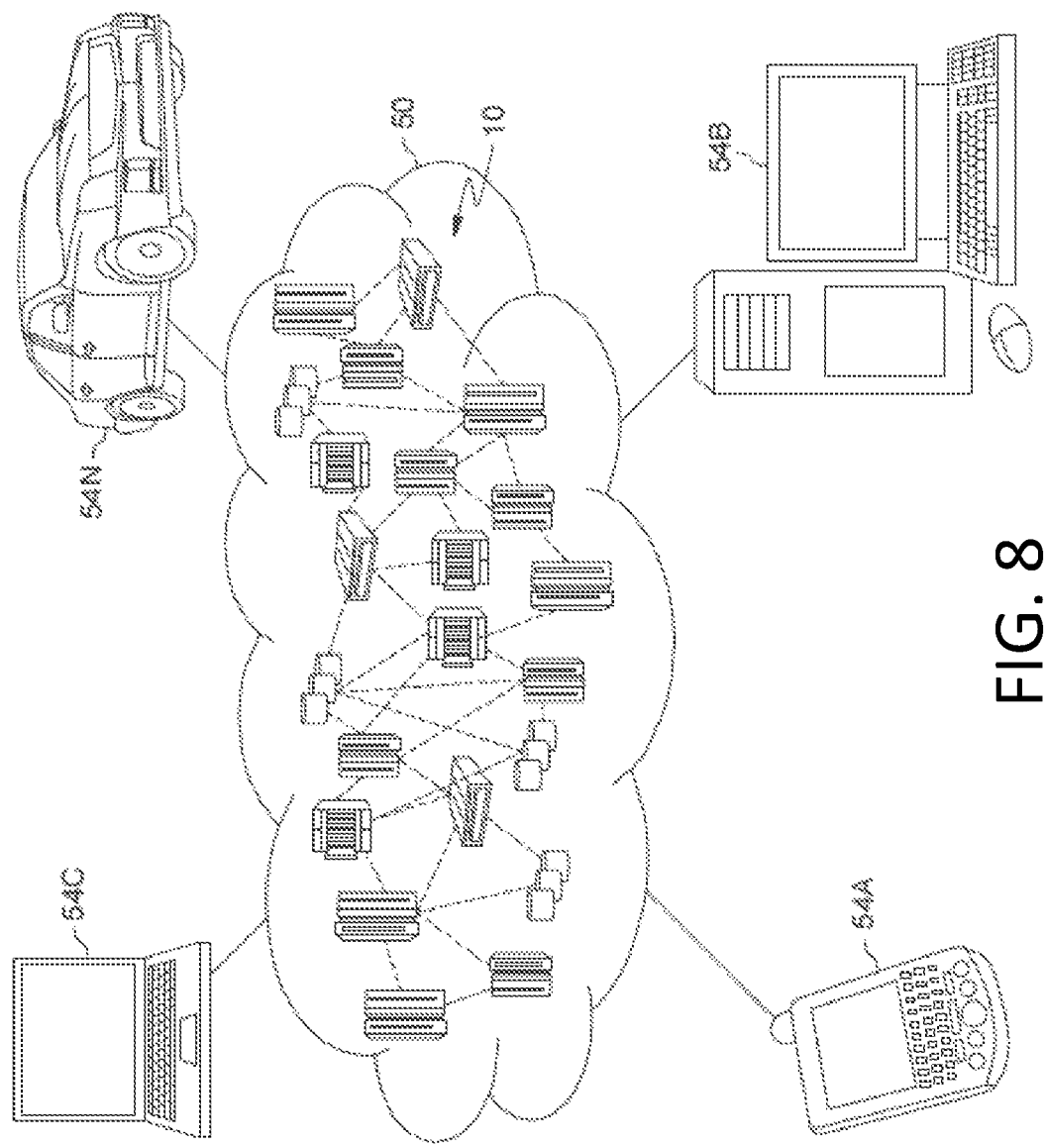
FIG. 8 depicts a cloud computing environment according to an embodiment of the present invention.
Figure 9:
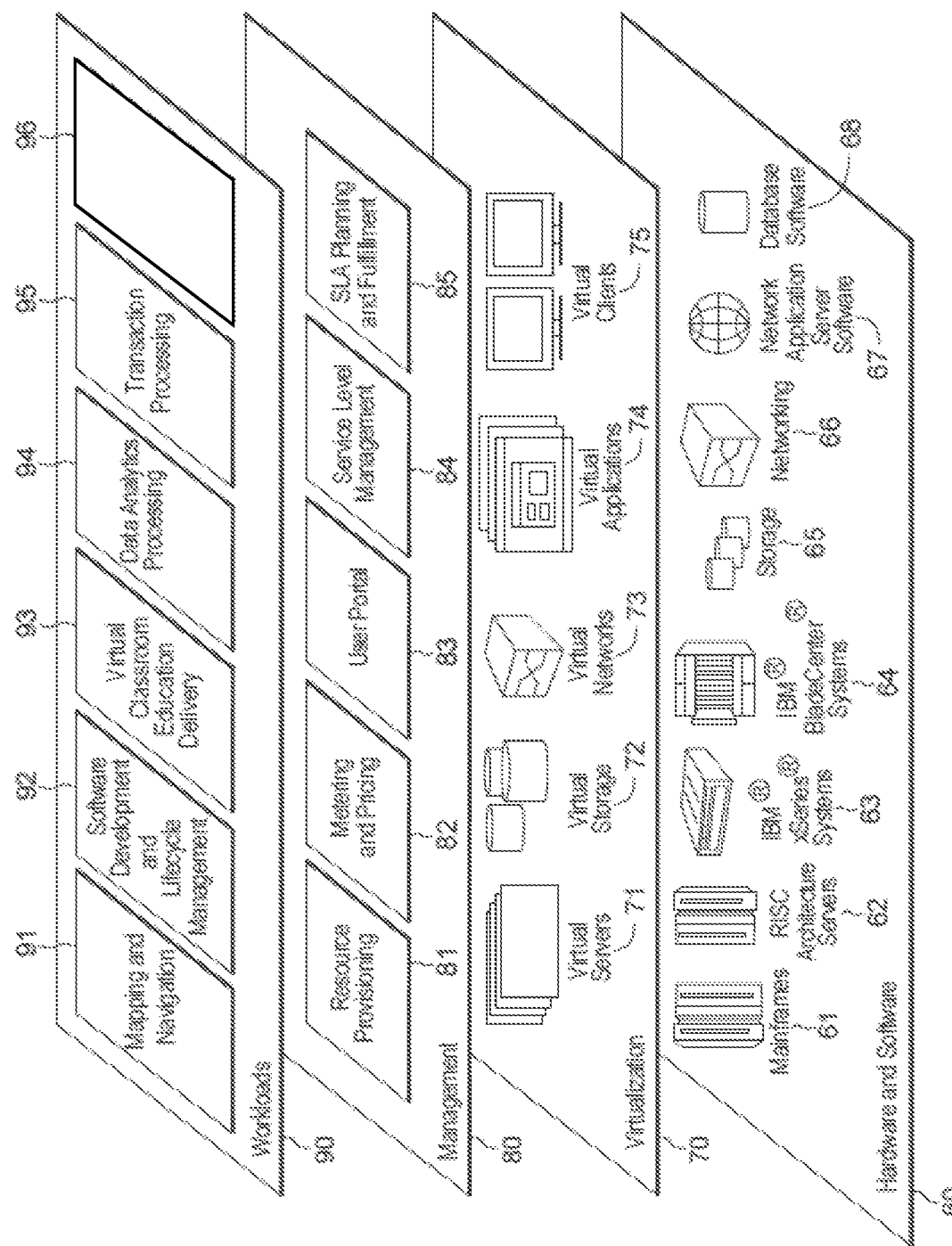
FIG. 9 depicts abstraction model layers according to an embodiment of the present invention.

FIGS. 7-9 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the profiling optimization engine 130 and the profiling optimization system 120 of FIG. 1, respectively. Program processes 42, as in the profiling optimization engine 130 of the profiling optimization system 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12 in cloud computing node 10. Examples, include, but are not limited to: microcode, device drivers, redundant processors, external disk drive arrays, RAID systems, tape drives, and data archival storage systems, etc.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the profiling optimization services as provided by the profiling optimization system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining, by one or more processor, a native code having a plurality of counters embedded at respective profiling locations in the native code, wherein a number of the counters is a first positive integer N;
    selecting, by the one or more processor, a plurality of use cases to be serviced by the obtained native code, wherein each of the use cases is a list of computational actions to be performed toward an end result of each use case, and wherein a number of the use cases is a second positive integer K;
    creating, by the one or more processor, K number of use cases profiles respectively corresponding to each use case amongst the selected K number of use cases, wherein each use case profile includes performance characteristics corresponding to respective use cases;
    determining, by the one or more processor, a minimal number of counters, referred to as best predictors, amongst the N number of counters embedded in the native code that identifies one of the K number of use case profiles from the creating, wherein the minimal number is a third positive integer B equal to a number of the best predictors;
    generating, by the one or more processor, variants respective to the use cases based on the determined best predictors, wherein each of the variants is a unique machine code customized for system requirements respectively corresponding to the use cases; and
    producing, by the one or more processor, the generated variants and corresponding use case profiles to one or more production environment to provide respective end results of the use cases for end users by performing the use cases.

2. The computer implemented method of claim 1, the creating comprising:
    running a use case of the use cases for a preconfigured number of times while cumulating values of the counters to thereby represent performance characteristics of the use case; and
    recording the cumulated values of the counters representing the performance characteristics of the use case as a use case profile for the use case.

3. The computer implemented method of claim 2, further comprising:
    mapping the use case profile to a point in a N-dimensional space;
    analyzing respective dependencies of the counters embedded in the native code on the use case; and
    mapping the counters to respective points in the N-dimensional space according to the analyzed respective dependencies on the use case.

4. The computer implemented method of claim 2, the determining comprising:
    identifying K number of points respectively corresponding the K number of use case profiles in the N-dimensional space; and
    ascertaining the B number of best predictors that distinguishes one use case profile from another by space partitioning of the N-dimensional space from the identifying the K number of points.

5. The computer implemented method of claim 4; wherein the space partitioning of the N-dimensional space is by use of Voronoi cells with the K number of points corresponding to the respective use case profiles as respective seeds.

6. The computer implemented method of claim 1, the generating comprising:
    removing, from the native code, counters that are not included in the best predictors from the determining;
    compiling the code resulting from the removing into an executable code having the best predictors; and
    replicating the executable code K number of times for respective use cases.

7. The computer implemented method of claim 1, further comprising:
    profiling the variants dynamically in the production environment by use of the use case profiles respectively corresponding to each variant, based on values counted from the best predictors embedded in the variants.

8. A computer program product comprising:
    a computer readable storage medium readable by one or more processor and storing instructions for execution by the one or more processor for performing a method comprising:
        obtaining a native code having a plurality of counters embedded at respective profiling locations in the native code, a number of the counters being referred to as a first positive integer N;

selecting a plurality of use cases to be serviced by the obtained native code, each of the plurality of the use cases is a list of computational actions to be performed toward an end result respectively corresponding to the use cases, and wherein a number of the use cases is a second positive integer K;

creating K number of use cases profiles respectively corresponding to each use case amongst the selected K number of use cases, wherein each use case profile includes performance characteristics corresponding to respective use cases;

determining a minimal number of counters, referred to as best predictors, amongst the N number of counters embedded in the native code that identify one of the K number of use case profiles from the creating, wherein the minimal number is a third positive integer B equal to a number of the best predictors;

generating variants respective to the use cases based on the determined best predictors, wherein each of the variants is a unique machine code customized for system requirements respectively corresponding to the use cases; and producing the generated variants and corresponding use case profiles to one or more production environment to provide respective end results of the use cases for end users by performing the use cases.

9. The computer program product of claim 8, the creating comprising:

running a use case of the use cases for a preconfigured number of times while cumulating values of the counters to thereby represent performance characteristics of the use case; and recording the cumulated values of the counters representing the performance characteristics of the use case as a use case profile for the use case.

10. The computer program product of claim 9, further comprising:

mapping the use case profile to a point in a N-dimensional space;

analyzing respective dependencies of the counters embedded in the native code on the use case; and mapping the counters to respective points in the N-dimensional space according to the analyzed respective dependencies on the use case.

11. The computer program product of claim 9, the determining comprising:

identifying K number of points respectively corresponding the K number of use case profiles in the N-dimensional space; and ascertaining the B number of best predictors that distinguishes one use case profile from another by space partitioning of the N-dimensional space from the identifying the K number of points.

12. The computer program product of claim 11; wherein the space partitioning of the N-dimensional space is by use of Voronoi cells with the K number of points corresponding to the respective use case profiles as respective seeds.

13. The computer program product of claim 8, the generating comprising:

removing, from the native code, counters that are not included in the best predictors from the determining;

compiling the code resulting from the removing into an executable code having the best predictors; and replicating the executable code K number of times for respective use cases.

14. The computer program product of claim 8, further comprising:

profiling the variants dynamically in the production environment by use of the use case profiles respectively corresponding to each variant, based on values counted from the best predictors embedded in the variants.

15. A system comprising:

a memory;

one or more processor in communication with memory; and program instructions executable by the one or more processor via the memory to perform a method comprising:

obtaining a native code having a plurality of counters embedded at respective profiling locations in the native code, a number of the counters being referred to as a first positive integer N;

selecting a plurality of use cases to be serviced by the obtained native code, each of the plurality of the use cases is a list of computational actions to be performed toward an end result respectively corresponding to the use cases, and wherein a number of the use cases is a second positive integer K;

creating K number of use cases profiles respectively corresponding to each use case amongst the selected K number of use cases, wherein each use case profile includes performance characteristics corresponding to respective use cases;

determining a minimal number of counters referred to as best predictors amongst the N number of counters embedded in the native code that identify one of the K number of use case profiles from the creating, wherein the minimal number is a third positive integer B;

generating variants respective to the use cases based on the determined B number of best predictors, wherein each of the variants is a unique machine code customized for system requirements respectively corresponding to the use cases; and producing the generated variants and corresponding use case profiles to one or more production environment to thereby provide respective end results of the use cases for end users by performing the use cases.

16. The system of claim 15, the creating comprising:

running a use case of the use cases for a preconfigured number of times while cumulating values of the counters to thereby represent performance characteristics of the use case; and recording the cumulated values of the counters representing the performance characteristics of the use case as a use case profile for the use case.

17. The system of claim 16, further comprising:

mapping the use case profile to a point in a N-dimensional space;

analyzing respective dependencies of the counters embedded in the native code on the use case; and mapping the counters to respective points in the N-dimensional space according to the analyzed respective dependencies on the use case.

18. The system of claim 16, the determining comprising:

identifying K number of points respectively corresponding the K number of use case profiles in the N-dimensional space; and ascertaining the B number of best predictors that distinguishes one use case profile from another by space partitioning of the N-dimensional space from the identifying the K number of points.

19. The system of claim 15, the generating comprising:
removing, from the native code, counters that are not included in the best predictors from the determining;
compiling the code resulting from the removing into an executable code having the best predictors; and
replicating the executable code K number of times for respective use cases.

20. The system of claim 15, further comprising:
profiling the variants dynamically in the production environment by use of the use case profiles respectively corresponding to each variant, based on values counted from the best predictors embedded in the variants.

\* \* \* \* \*